United States Patent
Kobori (10) Patent No.: US 12,554,369 B2
(45) Date of Patent: *Feb. 17, 2026

(54) SENSOR

(71) Applicant: Wacom Co., Ltd., Saitama (JP)

(72) Inventor: Takeshi Kobori, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/883,454

(22) Filed: Sep. 12, 2024

(65) Prior Publication Data

US 2025/0004603 A1    Jan. 2, 2025

Related U.S. Application Data (63) Continuation of application No. 18/309,535, filed on Apr. 28, 2023, now Pat. No. 12,118,173, which is a continuation of application No. PCT/JP2021/029716, filed on Aug. 12, 2021.

(30) Foreign Application Priority Data

Nov. 6, 2020   (JP) .................................. 2020-185482

(51) Int. Cl.
   *G06F 3/046*   (2006.01)
(52) U.S. Cl.
   CPC .................................. *G06F 3/046* (2013.01)
(58) Field of Classification Search
   None
   See application file for complete search history.

(56) References Cited

U.S. PATENT DOCUMENTS

| 10,296,112 | B2 * | 5/2019 | Yamada ................ G06F 3/0386 |
| 10,379,666 | B2 * | 8/2019 | Park ...................... G06F 3/0446 |
| 2014/0084907 | A1 * | 3/2014 | Kobori .................... H01Q 7/00 |
| | | | 324/207.24 |
| 2016/0291785 | A1 * | 10/2016 | Mizuhashi .............. G06F 3/046 |
| 2018/0059828 | A1 * | 3/2018 | Matsumoto ............. H05K 3/10 |
| 2022/0086267 | A1 * | 3/2022 | Shin ..................... H04M 1/0268 |
| 2022/0100234 | A1 * | 3/2022 | Kishimoto ............ G06F 1/1616 |

FOREIGN PATENT DOCUMENTS

| CN | 108268133 A | * | 7/2018 | ............. H02K 33/10 |
| JP | 2002531902 A | | 9/2002 | |
| JP | 2012003586 A | | 1/2012 | |
| JP | 2013186784 A | | 9/2013 | |
| JP | 2017510065 A | | 4/2017 | |
| JP | 2019071401 A | | 5/2019 | |
| KR | 20170124670 A | | 11/2017 | |
| KR | 20200119794 A | | 10/2020 | |

OTHER PUBLICATIONS

English Translation of International Search Report, mailed Oct. 19, 2021, for International Patent Application No. PCT/JP2021/029716. (2 pages).

* cited by examiner

*Primary Examiner* — Duane N Taylor, Jr.
(74) *Attorney, Agent, or Firm* — Seed Intellectual Property Law Group LLP (57) ABSTRACT

Provided is a sensor including loop coils arranged in multiple areas, in which a specific loop coil among the loop coils includes a first loop portion in a first area serially connected with a second loop portion in a second area different from the first area within the multiple areas.

20 Claims, 5 Drawing Sheets

SENSOR

BACKGROUND

Technical Field

The present disclosure relates to a sensor adapted advantageously for use with a coordinate input unit operated by electromagnetic induction.

Description of the Related Art

As disclosed in Japanese Patent Laid-open No. 2013-186784, for example, a typical sensor for use with an electromagnetic induction type coordinate input unit includes multiple rectangular loop coils arranged (arrayed) in each of the X direction (crosswise direction of the printed-circuit board) and the Y direction (longitudinal direction of the printed-circuit board) at a predetermined arrangement pitch. Each of the loop coils has a loop portion and is configured to be independently driven.

Recent years have seen the introduction of mobile devices such as mobile phone terminals and mobile computers each configured to offer the function of a coordinate input unit, with the above-described type of sensor overlaid on the backside of an attached display element (display device) having a display screen for displaying characters and images, the sensor detecting the positions pointed by an electronic pen on the display screen. This type of mobile device is easy to use and very convenient, receiving the input of diverse operations through its display screen.

Recently, the display screen of this type of mobile device has increased in size. However, a larger display screen entails an increase of the size of the mobile device and may detract from its portability. Hence, there have been proposed foldable mobile devices using a bendable flexible display element thereby providing a large display screen while remaining small in size (e.g., see Japanese Translations of PCT for Patent No. 2017-510065).

The above-described electromagnetic induction type coordinate input unit is made bendable by use of a flexible substrate. It is thus conceivable that the bendable sensor may be combined with the flexible display element such as one disclosed in Japanese Translations of PCT for Patent No. 2017-510065, to configure a foldable mobile device equipped with a coordinate input unit capable of receiving positions pointed by an electronic pen.

The mobile device having the above type of input apparatus offers a display screen of a flexible display element over the entire one side of the housing in a fully unfolded state. It is therefore possible to provide a display screen that is double the size in the folded state. Also, the area that is the same as the display screen can be used as a sensor detection area capable of detecting the positions pointed by the electronic pen.

However, the problem outlined below can occur in a case where the mobile device is configured to be foldable as described above.

That is, the above-described mobile device is frequently switched between the folded state and the unfolded state. This can lead to the sensor having its electrode conductors degraded at a bending portion where the bending motion is repeated.

One way of solving the above problem may have the sensor body divided into two sensors bordering with each other at the bending portion and provide an output information processing section to process the outputs of detected positions from the two sensors in a manner handling their outputs as if they are from a single sensor.

In such a configuration, however, it is necessary to drive independently each of the loop coils of the two sensors. This entails the number of drive circuit channels for driving the individual loop coils being twice as large as that in the configuration of a single foldable sensor. This results in a larger circuit size and power consumption increase.

BRIEF SUMMARY

It is therefore an object of the present disclosure to provide a sensor capable of solving the above problem.

In solving the above problem and according to one embodiment of the present disclosure, there is provided a sensor having a plurality of loop coils arranged in multiple areas. A specific loop coil among the loop coils includes a first loop portion in a first area serially connected with a second loop portion in a second area different from the first area within the multiple areas.

In the sensor configured as outlined above, the specific loop coil including the first and second loop portions is provided separately in the first and second areas. This makes it possible to fold the first and second areas on each other by a bendable member interposed therebetween. With the two loop portions serially connected to each other, the loop coil formed by the two loop portions is driven as a single channel. This can reduce the number of drive circuit channels.

DETAILED DESCRIPTION

Described below with reference to the accompanying drawings is a sensor embodying the present disclosure along with an example of a mobile device that uses the sensor.

Explanation of an Example of the Mobile Device

Figure 1A:
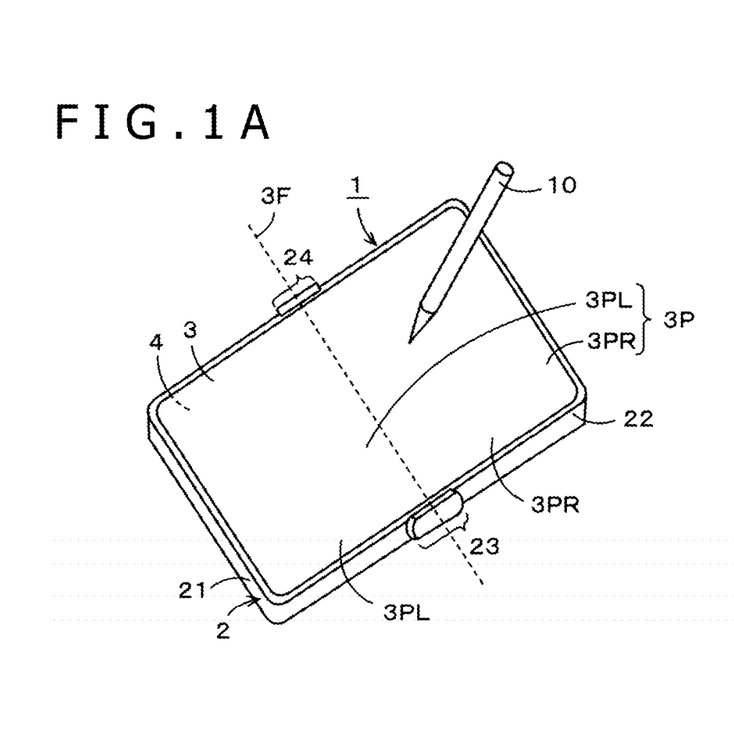
FIG. 1A is a diagram explaining an example of a mobile device on which a sensor is mounted according to an embodiment of the present disclosure.
Figure 1B:
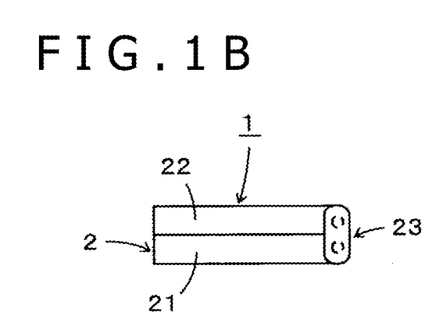
FIG. 1B is another diagram explaining an example of the mobile device on which the sensor is mounted according to the embodiment of the present disclosure.

FIG. 1 depicts an example of a mobile device that uses the sensor embodying the present disclosure. This is an exemplary mobile device configured to be foldable with use of a bendably-structured housing.

FIGS. 1A and 1B are diagrams for outlining the configuration of a mobile device 1 of this example. The mobile device 1 of this example has a foldable housing 2, a flexible display element 3, and a foldable electromagnetic induction type sensor 4. The mobile device 1 in FIGS. 1A and 1B is an example in which the housing 2 can be folded (mountain-folded) on the display screen side of the flexible display element 3. FIG. 1A depicts a state where the mobile device 1 of this example is fully unfolded, and FIG. 1B indicates a state where the mobile device 1 of this example is folded.

When the mobile device 1 of this example is in the unfolded state as in FIG. 1A, a display screen 3P of the flexible display element 3 is exposed. When positions are pointed on the display screen 3P by an electromagnetic induction type electronic pen 10, the positions pointed by the electronic pen 10 are detected by the electromagnetic induction type sensor 4 provided on the underside (backside) of the display screen 3P. In this embodiment, the display area of the display screen 3P coincides approximately with a position detection area of the sensor 4. The display screen 3P is used as the surface through which to input positions pointed by the electronic pen 10. The positions pointed by electronic pen 10 over the entire input surface are detected by the sensor 4.

As depicted in FIGS. 1A and 1B, the housing (enclosure) 2 of the mobile device 1 of this example is structured to have a first frame member 21 and a second frame member 22 foldably coupled with each other at hinge portions 23 and 24. The housing 2 houses the flexible display element 3, the sensor 4, and an electronic circuit section (not depicted in FIGS. 1A and 1B) connected therewith. It is to be noted that the flexible display element 3 is exposed to the outside when the housing 2 is unfolded.

As described above, the mobile device 1 in this embodiment is configured such that the first frame member 21 and the second frame member 22 are pivoted on the hinge portions 23 and 24 to let the housing 2 be switched between the folded state as in FIG. 1B and the fully-unfolded state as in FIG. 1A. A position 3F indicated by the broken line in FIG. 1A denotes the bending position of the display screen 3P.

Exemplary Configuration in the Housing 2 of the Mobile Device 1

Figure 2:
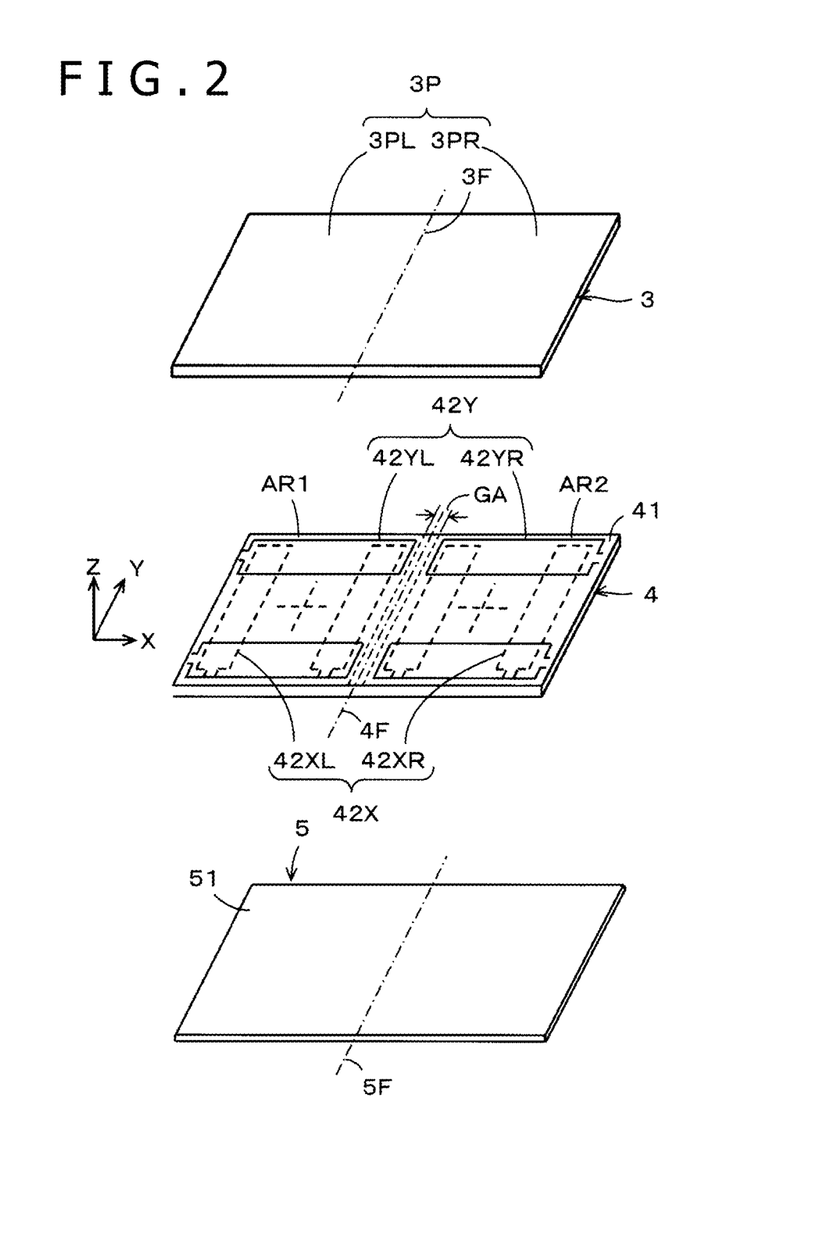
FIG. 2 is a diagram explaining the sensor according to the embodiment of the present disclosure.

As described above, the housing 2 houses the flexible display element 3, the sensor 4, and the electronic circuit section connected therewith. FIG. 2 is an exploded perspective view for explaining these components.

The flexible display element 3 includes an organic electroluminescence (EL) display element or a liquid crystal display (LCD), for example. The flexible display element 3 has the display screen 3P furnished with numerous display pixels arranged in the X-axis direction (crosswise direction) as well as in the Y-axis direction (longitudinal direction). When the crosswise direction of the display screen 3P is regarded as the X-axis direction and its longitudinal direction as the Y-axis direction, the bending position 3F extends linearly in parallel with the Y-axis direction (the bending portion may have a predetermined width). As depicted in FIGS. 1A, 1B, and 2, a display area on the left of the bending position 3F of the display screen 3P, in the X-axis direction, constitutes a left-half display area 3PL surrounded by the first frame member 21, and a display area on the right of the bending position 3F constitutes a right-half display area 3PR surrounded by the second frame member 22. In this example, the left-half display area 3PL and the right-half display area 3PR are rectangular areas of the same size.

The underside of the flexible display element 3 (backside of the display screen 3P) is furnished with the electromagnetic induction type sensor 4 in a manner overlaid on the flexible display element 3. In this example, the sensor 4 includes multiple X-axis direction loop coils 42X arranged in the X-axis direction and multiple Y-axis direction loop coils 42Y arranged in the Y-axis direction on a flexible substrate 41.

In the example of FIG. 2, the Y-axis direction loop coils 42Y are arranged on the surface side of the flexible substrate 41, and the X-axis direction loop coils 42X are arranged on its backside. In this example, the sensor 4 may be arranged to be deposited on the backside of the display screen 3P of the flexible display element 3.

A circuit substrate 5 is provided on the side opposite to the side of the flexible display element 3 (input surface side) on which the sensor 4 is deposited. In this example, the circuit substrate 5 includes an electronic circuit section (not depicted) formed on a flexible substrate 51. The electronic circuit section includes a position detection circuit that detects the positions pointed by the electronic pen 10, a display control circuit that generates display images to be displayed on the display screen 3P, and a processing control circuit that performs predetermined control processes, all being connected to the sensor 4.

In this embodiment, the flexible display element 3, the sensor 4, and the circuit substrate 5 are held stacked one on top of another inside the housing 2. The first frame member 21 and the second frame member 22 are pivoted in a manner allowing the stacked flexible display element 3, the sensor 4, and the circuit substrate 5 to be bent.

In FIG. 2, a position 4F indicated by the broken line in the sensor 4 is the bending position of the sensor 4 corresponding to the bending position 3F of the flexible display element 3. A position 5F indicated by the broken line on the circuit substrate 5 is the bending position of the circuit substrate 5 corresponding to the bending position 3F of the flexible display element 3.

Embodiment of the Sensor

Figure 3:
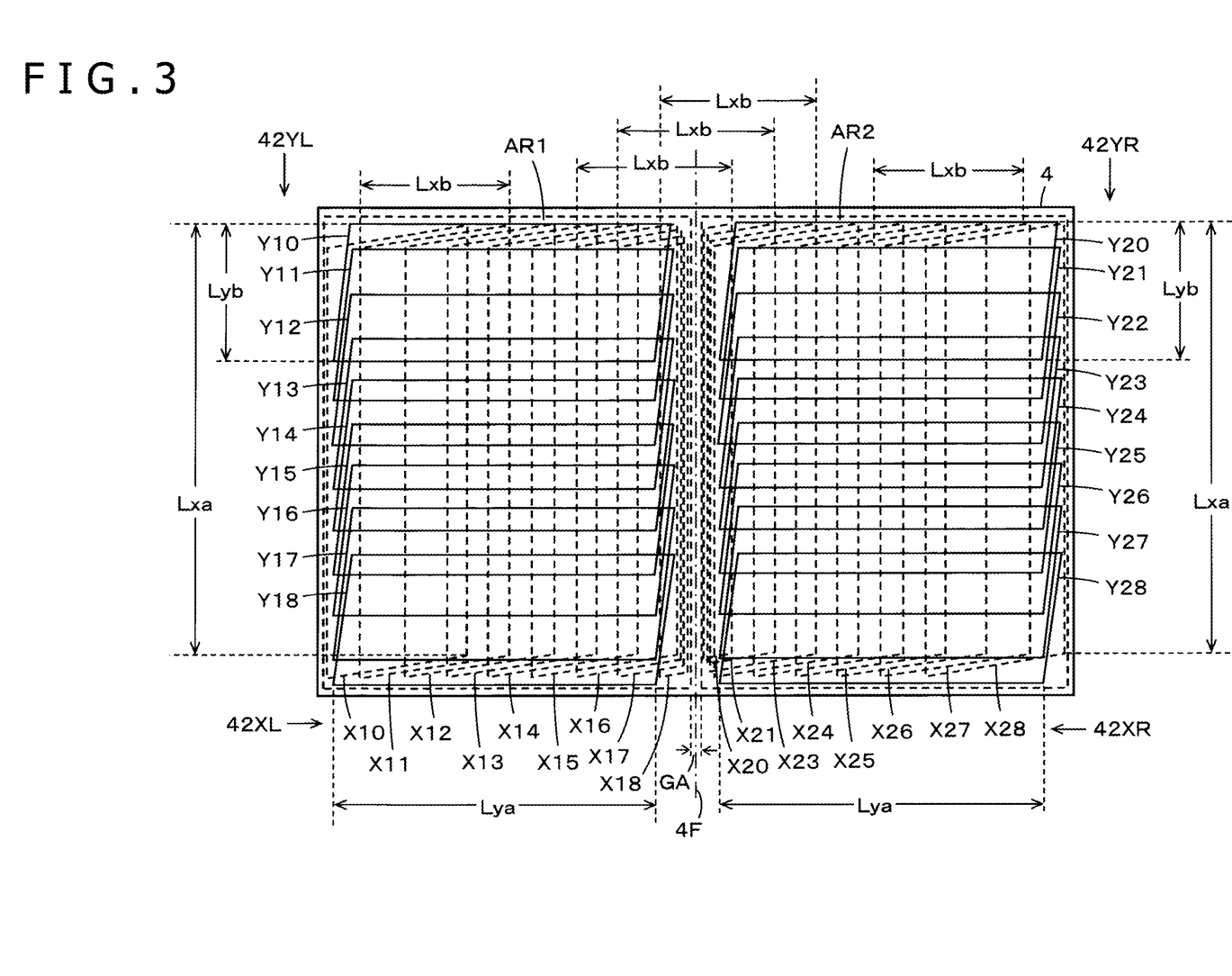
FIG. 3 is a diagram explaining an example of multiple loop portions in the sensor according to the embodiment of the present disclosure.

A configuration example of the sensor 4 of this embodiment is further described below with reference to FIGS. 3 through 5B. FIG. 3 is a diagram for explaining the exemplary configuration of the sensor 4 of this embodiment, depicting mainly a typical configuration of loop portions 42XL, 42XR, 42YL, and 42YR, to be discussed below, which make up the X-axis direction loop coils 42X and the Y-axis direction loop coils 42Y formed on the flexible substrate 41.

As depicted in FIG. 2, the sensor 4 has a loop portion conductor-formed area of the loop coils bisected in the X-axis direction by the bending position 4F in this example, the bisected area portions constituting a left-side area (example of a first area) AR1 and a right-side area (example of a second area) AR2. In a case of this example, as depicted in FIG. 2 and in FIG. 3 to be discussed later, a gap area GA is formed between the left-side area AR1 and the right-side area AR2. The length (width) of the gap area GA in the X-axis direction includes the bending position 4F. The length of the gap area GA is arranged to be relatively short so as to reduce or prevent degradation attributable to bending of the loop portion conductors formed in the left-side area AR1 and the right-side area AR2.

In this example, the left-side area AR1 and the right-side area AR2 of the sensor 4 are rectangular areas of the same size corresponding to the left-half display area 3PL and the right-half display area 3PR of the display area. The left-side area AR1 and the right-side area AR2 are adjacent to each other with the gap area GA interposed therebetween.

Each of the left-side area AR1 and the right-side area AR2 of the sensor 4 has the loop portions 42XL and 42XR formed to constitute the multiple X-axis direction loop coils 42X and has the loop portions 42YL and 42YR formed to constitute the multiple Y-axis direction loop coils 42Y.

In this example, as depicted in FIG. 3, the loop portions 42XL and 42XR are sequentially arranged to overlap with one another from left to right on the flexible substrate 41 at a predetermined arrangement pitch in each of the left-side area AR1 and the right-side area AR2. Also in this example, the loop portions 42YL and 42YR are sequentially arranged to overlap with one another from top to bottom on the flexible substrate 41 at a predetermined arrangement pitch in each of the left-side area AR1 and the right-side area AR2.

In this case, no loop coil conductors are formed in the gap area GA between the left-side area AR1 and the right-side area AR2. Thus, when the sensor 4 is bent at the bending position 4F, the problem of degradation of the loop coil conductors does not occur at the bending position 4F.

However, in a case where the multiple loop portions 42XL and 42XR and the multiple loop portions 42YL and 42YR provided in each of the left-side area AR1 and the right-side area AR2 of the sensor 4 are to be each driven as a single loop coil, the number of the loop coils to be driven by the drive circuit becomes larger than those in a case where multiple X-axis direction loop coils and multiple Y-axis direction loop coils are formed over the entire flexible substrate 41. As a result, the drive circuit is enlarged, and the power consumption is increased.

In the sensor 4 of this embodiment, between the multiple X-axis direction loop portions 42XL in the left-side area AR1 on one hand and the multiple X-axis direction loop portions 42XR in the right-side area AR2 on the other hand, specific pairs of the loop portions are configured to be serially connected to form a single loop coil each. In this configuration, the number of the X-axis direction loop coils to be driven is made substantially equal to that in a case where multiple X-axis direction loop coils are formed over the entire flexible substrate 41.

Likewise, between the multiple Y-axis direction loop portions 42YL in the left-side area AR1 on one hand and the multiple Y-axis direction loop portions 42YR in the right-side area AR2 on the other hand, specific pairs of the loop portions are configured to be serially connected to form a single loop coil each. In this configuration, the number of the Y-axis direction loop coils to be driven is made substantially equal to that in a case where multiple Y-axis direction loop coils are formed over the entire flexible substrate 41.

In this embodiment, as will be discussed later, between the multiple loop portions 42XL and the multiple loop portions 42XR in the X-axis direction and between the multiple loop portions 42YL and the multiple loop portions 42YR in the Y-axis direction, the specific loop portions serially connected in pairs to form a single loop coil each are those partially proximate to each other with the gap area GA interposed therebetween.

Although not depicted, interconnect line portions between the loop portions 42XL, 42XR, 42YL, and 42YR on one hand and the drive circuit of the circuit substrate 5 on the other hand are formed partially on the flexible substrate 41 of the sensor 4, partially the circuit substrate 5, or in some cases on another flexible substrate to provide connection between these substrates 41 and 5. The interconnect line portions are arranged to serially connect the specific multiple loop portions 42XL, 42XR, 42YL, and 42YR.

The specific loop coils to be serially connected are further explained below with reference to FIGS. 3 through 5B. Although the example of the sensor 4 in FIG. 3 includes nine loop portions 42XL, nine loop portions 42XR, nine loop portions 42YL, and nine loop portions 42YR, the numbers of the loop portions in FIG. 3 are given only for purpose of explanation and obviously are not limitative of the present disclosure.

In this example, as depicted in FIG. 3, nine loop portions X10, X11, X12, . . . , and X18 are formed as the X-axis direction loop portions XL and nine loop portions Y10, Y11, Y12, . . . , and Y18 are formed as the Y-axis direction loop portions 42YL in the left-side area AR1 of the flexible substrate 41. In the right-side area AR2 of the flexible substrate 41, nine loop portions X20, X21, X22, . . . , and X28 are formed as the X-axis direction loop portions 42XR and nine loop portions Y20, Y21, Y22, . . . , and Y28 are formed as the Y-axis direction loop portions 42YR.

In this example, the X-axis direction loop portions X10 through X18 and X20 through X28 are formed on the backside of the left-side area AR1 and the right-side area AR2 of the flexible substrate 41. The Y-axis direction loop portions Y10 through Y18 and Y20 through Y28 are formed on the surface side of the left-side area AR1 and the right-side area AR2 of the flexible substrate 41.

Figure 4A:
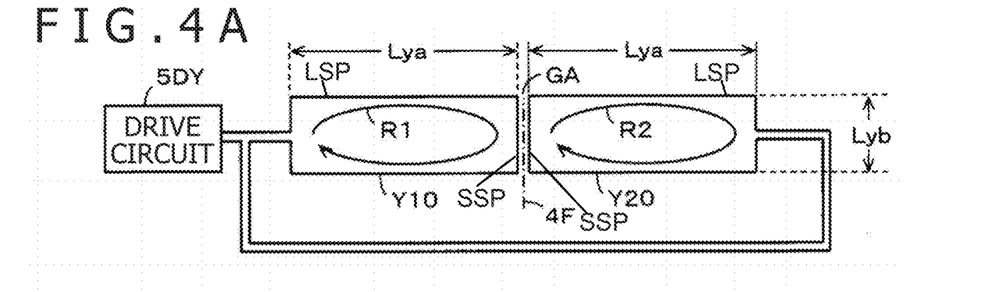
FIG. 4A is a diagram explaining a configuration of loop coils in a Y-axis direction in the sensor according to the embodiment of the present disclosure.

In a case of this example, as depicted in FIG. 3, the Y-axis direction loop portions Y10 through Y18 and Y20 through Y28 are all formed to have the same rectangular shape of the same size. FIG. 4A depicts one loop portion Y10 in the left-side area AR1 and one loop portion Y20 in the right-side area AR2. As indicated in FIGS. 3 and 4A, the Y-axis direction loop portions Y10 through Y18 and Y20 through Y28 each have a long-side length Lya, i.e., the X-axis direction length of the rectangular shape, which is slightly shorter than the crosswise length of the left-side area AR1 and the right-side area AR2. A Y-axis direction short-side length Lyb of the rectangular shape is longer than the arrangement pitch of the Y-axis direction loop portions.

In each of the left-side area AR1 and the right-side area AR2 of the flexible substrate 41, the Y-axis direction loop portions Y10 through Y18 and Y20 through Y28 are similarly formed at a predetermined arrangement pitch in the Y-axis direction. In this case, in the left-side area AR1 and the right-side area AR2, the loop portions Y10 through Y18 and Y20 through Y28 are arranged in the Y-axis direction at the same arrangement pitch in such a manner that the short sides of the rectangular loop portions in the same sequence positions are made proximate to each other, as depicted in FIGS. 3 and 4A.

Thus, as evident in FIG. 3, of the Y-axis direction loop portions of the sensor 4 in this embodiment, the loop portions Y10 through Y18 in the left-side area AR1 and the loop portions Y20 through Y28 in the right-side area AR2 all have the short sides of their rectangular shapes arranged to be proximate to each other in the same sequence positions with the gap region GA interposed therebetween.

In the sensor 4 of this embodiment, as depicted in FIG. 4A, the Y-axis direction loop portions Y10 through Y18 in the left-side area AR1 and the Y-axis direction loop portions Y20 through Y28 in the right-side area AR2 in the same sequence positions are all serially connected to each other to form nine loop coils. At this time, the loop portions Y10 through Y18 in the left-side area AR1 and the loop portions Y20 through Y28 in the right-side area AR2 are respectively connected in series before being connected to a drive circuit 5DY such that currents flow through their long-side portions in the same direction as indicated by the arrows R1 and R2 in FIG. 4A.

Hence, when the drive circuit 5DY drives each of the serially-connected loop portions Y10 through Y18 in the left-side area AR1 and the serially-connected loop portions Y20 through Y28 in the right-side area AR2, the currents flowing as indicated by the arrows R1 and R2 in FIG. 4A generate an induction field in a space surrounded by each of the loop portions Y10 through Y18 in the left-side area AR1 and in a space surrounded by each of the loop portions Y20 through Y28 in the right-side area AR2.

Figure 4B:
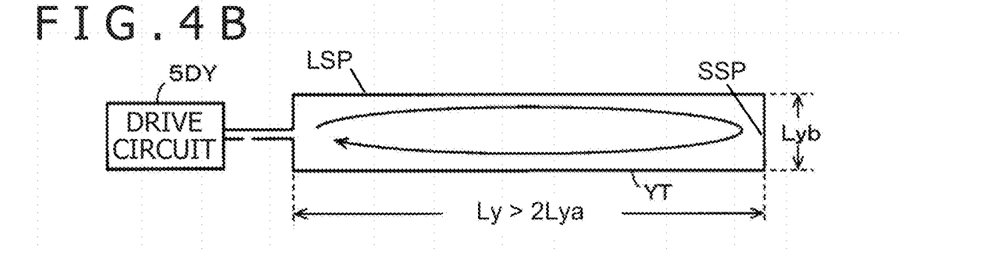
FIG. 4B is another diagram explaining the configuration of the loop coils in the Y-axis direction in the sensor according to the embodiment of the present disclosure.

In this case, however, as depicted in FIGS. 3 and 4A, the gap area GA has such a short length that there develops an induction field equivalent to that generated when the drive circuit 5DY drives a single loop coil YT in FIG. 4B formed in a manner encircling both the space surrounded by each of the loop portions Y10 through Y18 in the left-side area AR1 and the space surrounded by each of the loop portions Y20 through Y28 in the right-side area AR2. As shown in FIG. 4A, each of the loop portions Y10 and Y20 includes a long-side part LSP having the long-side length Lya, and a short-side part SSP having the short-side length Lyb. As shown in FIG. 4B, the single loop coil YT includes a long-side part LSP having a long-side length Ly, which is greater than twice the long-side length Lya, and a short-side part SSP having the short-side length Lyb. The effects derived from the two configurations are similar.

That is, in the sensor 4 of this embodiment, the area in which the loop coils are arranged on the flexible substrate 41 is bisected into the left-side area AR1 and the right-side area AR2 in the X-axis direction, thereby forming the loop portions 42YL and 42YR separately in the Y-axis direction. The bisected loop portions 42YL and 42YR are then serially connected to configure an equivalent Y-axis direction loop coil with its long side aligned with the entire area of the flexible substrate 41 in the X-axis direction.

As a result, in the sensor 4 of this embodiment, it is possible to forestall an increase in the number of drive circuit channels while preventing degradation of the loop portion conductors attributable to bending of multiple Y-axis direction loop coils (equivalent loop coils) arranged at a predetermined arrangement pitch in the Y-axis direction. This makes it possible to reduce the scale of the loop coil drive circuit in the Y-axis direction and thereby save power.

Explained next is a configuration example of the X-axis direction loop coils in the sensor 4 of this embodiment.

Figures 5A, 5B:
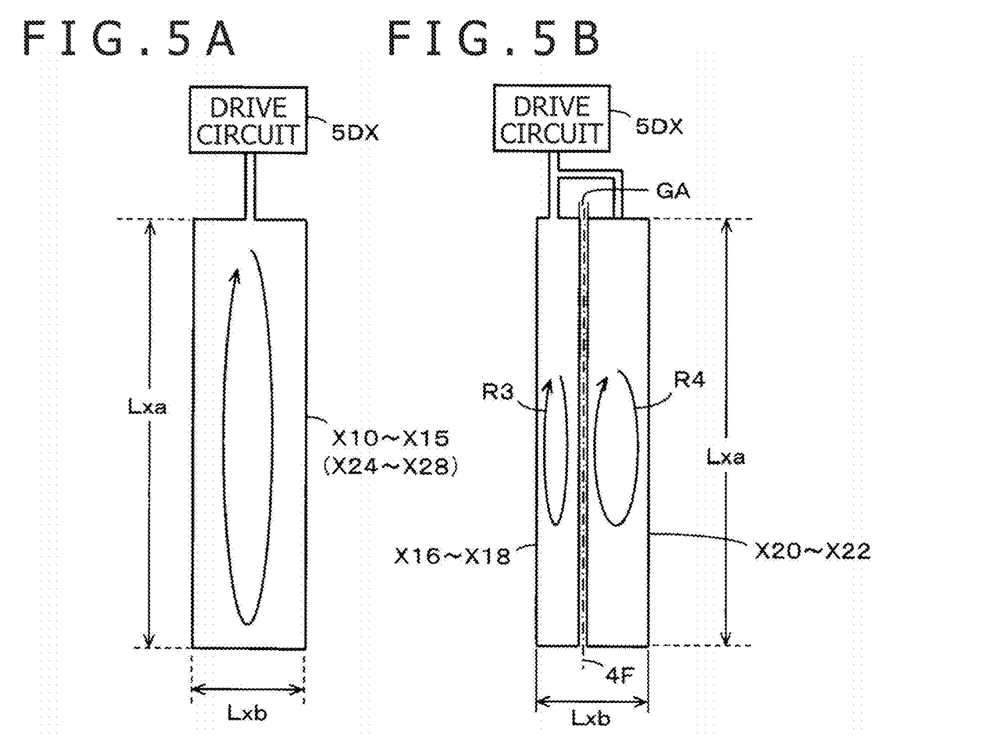
FIG. 5A is a diagram explaining a configuration of loop coils in an X-axis direction in the sensor according to the embodiment of the present disclosure.
FIG. 5B is another diagram explaining the configuration of the loop coils in the X-axis direction in the sensor according to the embodiment of the present disclosure.

The X-axis direction loop coils are arranged at a predetermined arrangement pitch successively from one side to the other (from left-side edge to right-side edge) of the flexible substrate 41 in the X-axis direction. In a case of this example, the X-axis direction loop coils have the same rectangular shape of the same size each, the long side and the short side of the rectangular shape being in the Y-axis direction and in the X-axis direction, respectively, as depicted in FIG. 5A. Also, as indicated in FIG. 5A, the long side of the X-axis direction loop coils has a length Lxa, which is slightly shorter than the longitudinal (Y-axis direction) length of the flexible substrate 41. The short side of the X-axis direction loop coils has a length Lxb, which is longer than the arrangement pitch of the loop coils.

In the sensor 4 of this embodiment, the X-axis direction length of the left-side area AR1 and the right-side area AR2 on the flexible substrate 41 is shorter than the short-side length Lxb of the X-axis direction loop coils. For this reason, of the X-axis direction loop portions X10 through X18 and X20 through X28 in the left-side area AR1 and the right-side area AR2, the loop portions X10 through X15 and X23 through X28 not overlapping with the bending position 4F can configure the X-axis direction loop coils as depicted in FIG. 5A.

However, because the loop portions X16 through X18 found in the left-side area AR1 and overlapping with the bending position 4F make up loop portions in this left-side area AR1, their short-side length becomes shorter than the short-side length Lxb of the X-axis direction loop coils in FIGS. 5A and 5B, as depicted in FIG. 3. Hence, in this embodiment, as indicated in FIG. 5B, the sum of the short-side length of the loop portions X16 through X18 in the left-side area AR1 and of the short-side length of the loop portions X20 through X23 in the right-side area AR2 is made equal to the short-side length Lxb of the X-axis direction loop coils in FIG. 5A. As a result, the short-side length of the loop portions X20 through X22 in the right-side area AR2 becomes shorter than the short-side length Lxb of the X-axis direction loop coils in FIGS. 5A and 5B.

Serially connecting the loop portions X16 through X18 in the left-side area AR1 with the loop portions X20 through X22 in the right-side area AR2 constitutes an equivalent configuration that functions similarly to the X-axis direction loop coils in FIG. 5A.

With this embodiment, in the example of FIG. 3, the loop portion X16 paired with the loop portion X20, the loop portion X17 paired with the loop portion X21, and the loop portion X18 paired with the loop portion X22 are configured in such a manner that the sum of their short-side lengths becomes equal to the length Lxb. The paired loop portions are serially connected with each other as depicted in FIG. 5B. At this time, the above-described pairs of the loop portions X16 through X18 in the left-side area AR1 with the loop portions X20 through X22 in the right-side area AR2 are serially connected such that currents flow in the same direction in the long-side portions as indicated by the arrows R3 and R4 in FIG. 5B, the paired loop portions being further connected to a drive circuit 5DX.

Consequently, when the drive circuit 5DX drives the above-mentioned serially connected pairs of the loop portions X16 through X18 in the left-side area AR1 with the loop portions X20 through X22 in the right-side area AR2, currents flow as indicated by the arrows R3 and R4 in FIG. 5B. This generates an induction field in the space surrounded by each of the loop portions X16 through X18 in the left-side area AR1 and in the space surrounded by each of the loop portions X20 through X22 in the right-side area AR2.

In this case, however, as depicted in FIGS. 3 and 5B, the gap area GA has such a short length that there develops an induction field equivalent to that generated when the drive circuit 5DX drives a single X-axis direction loop coil formed in a manner encircling both the space surrounded by each of the loop portions X16 through X18 in the left-side area AR1 and the space surrounded by each of the loop portions X20 through X22 in the right-side area AR2. The effects derived from the two configurations are similar.

Consequently, even though the area in which the loop coils are arranged on the flexible substrate 41 is bisected into the left-side area AR1 and the right-side area AR2 in the X-axis direction in the sensor 4 of this embodiment, serially connecting the X-axis direction loop portions near the gap area GA between the right and left areas can provide an equivalent configuration in which the multiple X-axis direction loop coils, or 15 loop coils in this example (see FIG. 5A) having the long-side length Lxa and the short-side length Lxb, are arranged at a predetermined arrangement pitch over the entire area of the flexible substrate 41 in the X-axis direction.

As a result, in the sensor 4 of this embodiment, it is possible to forestall an increase in the number of drive circuit channels while preventing degradation of the loop portion conductors attributable to bending of the multiple X-axis direction loop coils arranged at a predetermined arrangement pitch in the X-axis direction. This makes it possible to reduce the scale of the loop coil drive circuit in the X-axis direction and save power at the same time.

Another Embodiment

The sensor 4 of the above-described embodiment is the case where the present disclosure is applied to a mobile device of which the housing is foldable in half. The area in which to form the loop coils in the sensor 4 is thus bisected into two areas by the bending position 4F. Alternatively, the present disclosure can also be applied to cases where the area in which to form the loop coils in the sensor is divided into three or more areas.

Figure 6A:
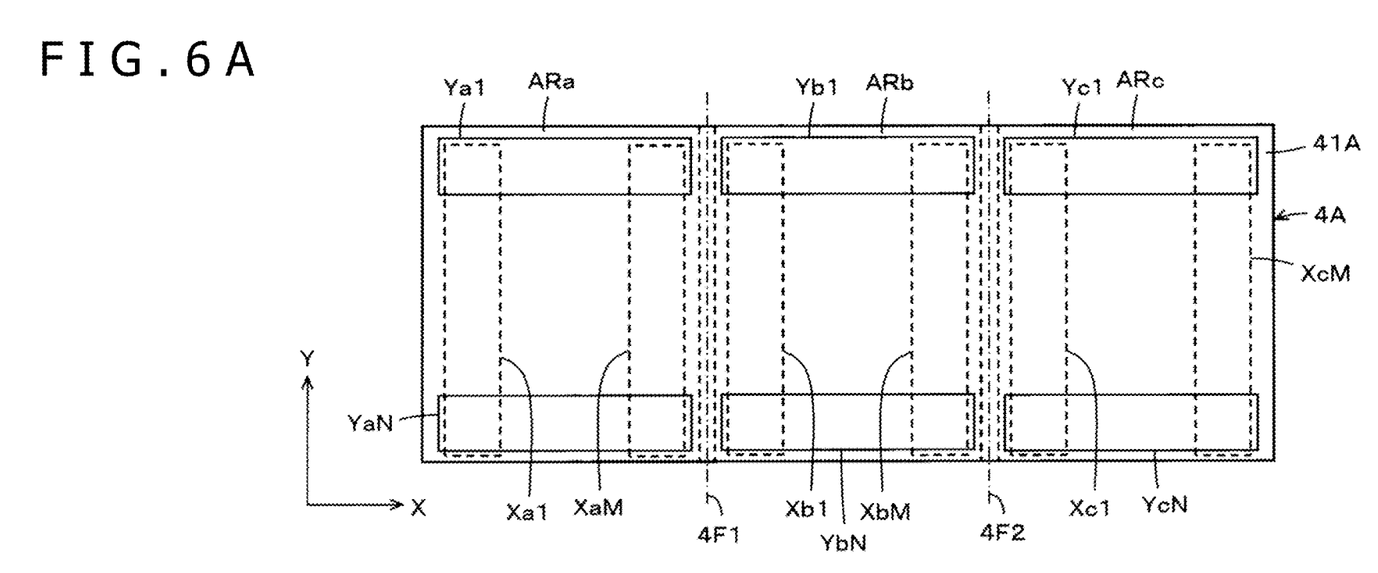
FIG. 6A is a diagram explaining an example of multiple loop portions in a sensor according to another embodiment of the present disclosure.
Figure 6B:
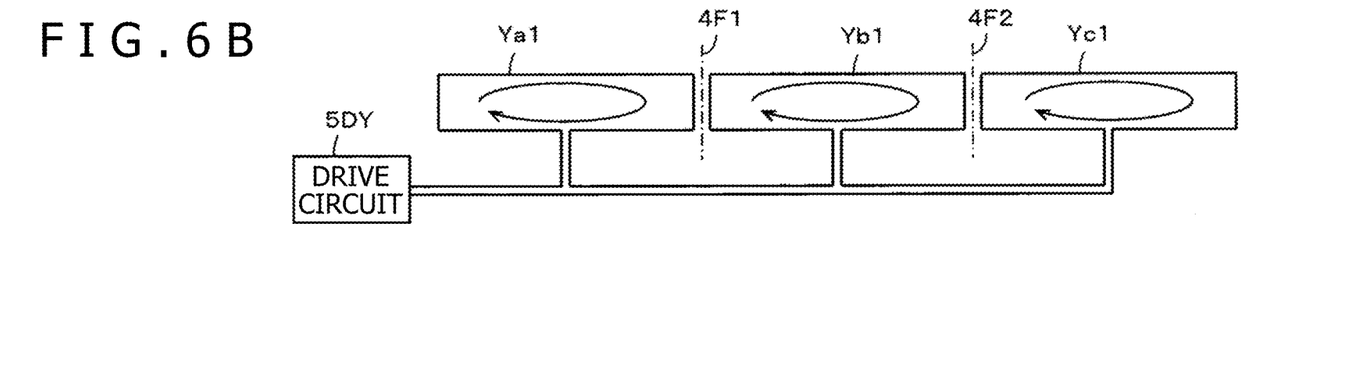
FIG. 6B is another diagram explaining an example of the multiple loop portions in the sensor according to the other embodiment of the present disclosure.

For example, the present disclosure may be applied to a sensor for use with a mobile device that is folded in three. FIGS. 6A and 6B are diagrams explaining an example of a sensor 4A for use with a mobile device of which the housing is foldable in three.

In the sensor 4A of this example, as depicted in FIG. 6A, the area in which to arrange loop coils on a flexible substrate 41A is divided by two bending positions 4F1 and 4F2 into three adjacent areas ARa, ARb, and ARc in the X-axis direction. Each of the areas ARa, ARb, and ARc, as in the above-described embodiment, has multiple loop portions Xa1 through XaM (M is an integer of at least 2) formed in the X-axis direction, loop portions Ya1 through YaN (N is an integer of at least 2) formed in the Y-axis direction, multiple loop portions Xb1 through XbM formed in the X-axis direction, loop portions Yb1 through YbN in the Y-axis direction, multiple loop portions Xc1 through XcM formed in the X-axis direction, and loop portions Yc1 through YcN formed in the Y-axis direction.

With respect to the X-axis direction loop coils of the sensor 4A, as in the case of the sensor 4 of the above-described embodiment, those of the multiple loop portions Xa1 through XaM and Xb1 through XbM in the areas ARa and ARb which are proximate to the bending position 4F1 have their short-side lengths adjusted in a manner similar to the above embodiment and are connected serially to each other. Also, those of the multiple loop portions Xb1 through XbM and Xc1 through XcM in the areas ARb and ARc which are proximate to the bending position 4F2 have their short-side lengths adjusted in a manner similar to the above embodiment and are connected serially to each other. In this manner, in the X-axis direction of the flexible substrate 41A, the loop coils can be formed equivalently to those arranged sequentially at a predetermined arrangement pitch in the X-axis direction.

In this example, with regard to the Y-axis direction loop coils of the sensor 4A in the three areas ARa, ARb, and ARc, three Y-axis direction loop portions arranged in the X-axis direction, e.g., loop portions Ya1, Yb1, and Yc1 in FIG. 6A, are sequentially connected in series to each other before being connected to a drive circuit 5DY. In this case, too, the three loop portions arranged in the X-axis direction are serially connected in such a manner that currents flow in the same direction in each of the loop portions.

In the sensor 4A of this example, it is also possible to forestall an increase in the number of drive circuit channels while preventing degradation of the loop portion conductors attributable to bending of the multiple loop coils arranged at a predetermined arrangement pitch in the X-axis direction and of the multiple loop coils arranged at a predetermined arrangement pitch in the Y-axis direction. This makes it possible to reduce the scale of the loop coil drive circuit and save power at the same time.

Obviously, similar configurations are made possible in cases of folding the device in more than three.

Other Embodiments or Variations

In the exemplary case of the sensor for use with the foldable mobile device in the above-described embodiments, a flexible substrate is employed as the sensor substrate. Alternatively, the first area and the second area, or the three areas in the example of FIGS. 6A and 6B, may be formed by hard printed-circuit boards that are coupled to each other with a bendable member such as a flexible substrate interposed therebetween.

Also, in the above-described embodiments, the sensor is configured to be bendable because it is for use with a foldable mobile device. Alternatively, the present disclosure may be applied to a sensor that need not be bent. In this case, too, the sensor according to the present disclosure provides an advantageous effect of forestalling an increase in the number of channels for driving multiple loop portions.

For example, in a case where it is desired to extend the length of the sensor in the X-axis direction, the loop portions of the first area and those in the second area may be serially connected to each other in the manner described above. This makes it possible to meet the need for the extension while forestalling an increase in the number of channels for driving the loop coils.

In the above-described embodiment, the first and second areas are configured to have the same size. Alternatively, in a case where the need for the extension is to be met, there obviously is no need for the areas to be of the same size. Also, the first and second areas may be differently shaped. It follows that the present disclosure may be applied to a case where the foldable portions of the sensor used in the foldable mobile device may be different in size from each other.

In the above-described embodiment, the areas where the first and second loop portions to be serially connected are configured to be adjacent to each other. Alternatively, these areas need not be adjacent to each other and may be separated from one another. For example, in a case where the pointing by a position pointing device such as an electronic pen to either a first loop portion or a second loop portion separated from each other is to be detected, serially connecting the first and second loop portions makes it possible to standardize the drive channels and reduce the circuit scale, thereby contributing to saving power at the same time.

The shape of the loop portions is not limited to being rectangular. The loop portions may alternatively be circular in shape, or may have any other shape.

With the embodiments above, it is explained, for example, that the area in which the sensor loop coils are arranged is divided in the X-axis direction. Alternatively, the present disclosure may be applied to a case where the loop coils are divided in the Y-axis direction. In this case, it is to be noted that the processing of the X-axis loop portions and that of the Y-axis loop portions are interchanged with respect to the above-described embodiments.

With the embodiments above, it is also explained, for example, that the loop coils of the sensor are arranged in both the X-axis direction and the Y-axis direction. The present disclosure, however, can also be applied to a case of a sensor in which the loop coils are arranged in either the X-axis direction or the Y-axis direction only.

The serially-connected first and second loop portions are explained above regarding the case in which the multiple loop portions are arranged in both the first area and the second area. Alternatively, the present disclosure can be applied to a case where a single loop portion is arranged in each of the first and second areas.

As many apparently different embodiments of the present disclosure may be made without departing from the spirit and scope thereof, it is to be understood that the present disclosure is not limited to the specific embodiments thereof except as defined in the appended claims.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
a display device; and
a sensor adjacent to the display device, wherein the sensor includes a plurality of loop coils arranged in multiple areas,
wherein a specific loop coil among the plurality of loop coils includes a first loop portion in a first area serially connected with a second loop portion in a second area different from the first area within the multiple areas,
wherein, in operation, current flows from the first loop portion to the second loop portion.

2. The apparatus according to claim 1, wherein:
the display device and the sensor are flexible, and
wherein a bending portion of the display device corresponds to a bending portion of the sensor.

3. The apparatus according to claim 2, wherein the bending portion of the sensor is between the first area and the second area.

4. The apparatus according to claim 2, further comprising:
a circuit substrate coupled to the loop coils.

5. The apparatus according to claim 4, wherein:
the circuit substrate is flexible, and
a bending portion of the circuit substrate corresponds to the bending portion of the display device and the bending portion of the sensor.

6. The apparatus according to claim 4, wherein the loop coils are between the display device and the circuit substrate.

7. The apparatus according to claim 1, wherein the first area and the second area are adjacent to each other.

8. The apparatus according to claim 7, wherein: the first and second loop portions of the specific loop coil are partially proximate to each other between the first and second areas, and the first and second areas are adjacent to each other.

9. The apparatus according to claim 8, wherein the first and second areas are each rectangular in shape, and the first and second loop portions each have a rectangular shape.

10. The apparatus according to claim 7, wherein:
multiple first loop portions are arranged in the first area in a first direction intersecting a second direction in which the first and second areas are adjacent to each other,
multiple second loop portions are arranged in the second area in the first direction in which the multiple first loop portions are arranged in the first area,
multiple specific loop coils include the multiple first loop portions in the first area serially connected with the multiple second loop portions in the second area, and
the multiple first loop portions and the multiple second loop portions have parts that are aligned with the first direction and are proximate to each other.

11. The apparatus according to claim 10, wherein the multiple first loop portions and the multiple second loop portions each have a same length in the first direction and are formed at a same arrangement pitch.

12. The apparatus according to claim 7, wherein:
multiple first loop portions are arranged in the first area in a first direction in which the first and second areas are adjacent to each other,
multiple second loop portions are formed in the second area in first direction in which the multiple first loop portions are arranged,
multiple specific loop coils each include at least one of the multiple first loop portions serially connected with at least one of the multiple second loop portions,
the multiple first loop portions have parts that are in a second direction intersecting the first direction in which the multiple first loop portions are arranged and proximate to a position in which the first and second areas are adjacent to each other,
the multiple second loop portions have parts that are in the second direction intersecting the first direction which the multiple first loop portions are arranged and are proximate to the position in which the first and second areas are adjacent to each other.

13. The apparatus according to claim 12, wherein the loop coils other than the multiple specific loop coils are configured by either the multiple first loop portions or the multiple second loop portions only.

14. The apparatus according to claim 12, wherein:
the multiple first loop portions and the multiple second loop portions are formed at a same arrangement pitch,
the loop coils other than the multiple specific loop coils are configured by either the multiple first loop portions or the multiple second loop portions only, and
a sum of spaces surrounded by the first multiple loop portions and the second multiple loop portions connected serially to configure the multiple specific loop coils is substantially same as a space surrounded by either the multiple first loop portions or the multiple second loop portions of the loop coils other than the multiple specific loop coils.

15. The apparatus according to claim 7, wherein:
multiple first loop portions are included in the first area,
multiple second loop portions are included in the second area,
of the multiple first loop portions in the first area, first multiple first-direction loop portions are arranged in a first direction intersecting a second direction in which the first and second areas are adjacent to each other, and first multiple second-direction loop portions are arranged in the second direction in which the first and second areas are adjacent to each other, of the multiple second loop portions in the second area, second multiple first-direction loop portions are arranged in the first direction intersecting the second direction in which the first and second areas are adjacent to each other, and second multiple second-direction loop portions are arranged in the second direction in which the first and second areas are adjacent to each other, multiple specific loop coils each include a specific first-direction loop coil arranged in the first direction and a specific second-direction loop coil arranged in the second direction, multiple specific first-direction loop coils include the first multiple first-direction loop portions in the first area serial connected with the second multiple first-direction loop portions in the second area, the multiple specific first-direction loop coils having parts that are aligned with the first direction and are proximate to each other, and multiple specific second-direction loop coils include at least one of the first multiple second-direction loop portions formed in the first area, having parts that are in a direction intersecting the second direction, and proximate to a position in which the first and second areas are adjacent to each other, with at least one of the second multiple second-direction loop portions formed in the second area and having parts that are in a direction intersecting the first direction and are proximate to the position in which the first and second areas are adjacent to each other.

16. The apparatus according to claim 15, wherein, of the plurality of loop coils configured by the first and second multiple second-direction loop portions in the first and second areas, the loop coils other than first and second multiple specific second-direction loop coils are configured by either the first multiple second-direction loop portions in the first area or by the second multiple second-direction loop portions in the second area only.

17. The apparatus according to claim 15, wherein:
the first and second multiple second-direction loop portions in the first and second areas are formed at a same arrangement pitch, of the plurality of loop coils configured by the first and second multiple second-direction loop portions in the first and second areas, the loop coils other than first and second multiple specific second-direction loop coils are configured by either the first multiple second-direction loop portions in the first area or by the second multiple second-direction loop portions in the second area only, and a sum of spaces surrounded by the first and second loop portions connected serially to configure the first and second multiple specific second-direction loop coils is substantially same as a space surrounded by either the first loop portions or the second loop portions of the loop coils other than the first and second multiple specific second-direction loop coils among the plurality of loop coils configured by the first and second multiple second-direction loop portions in the first and second areas.

18. The apparatus according to claim 1, wherein at least an intermediate portion between the first area and the second area is configured to be bendable.

19. The apparatus according to claim 18, wherein the first area and the second area have substantially a same shape, and the first area and the second area are folded on each other when bent at an intermediate portion therebetween.

20. The apparatus according to claim 1, wherein the first area and the second area are located on different substrates.

* * * * *